United States Patent
Shindo et al.

[15] 3,692,776
[45] Sept. 19, 1972

[54] PROCESS FOR PREPARING 7-CHLORO-1,3-DIHYDRO-1-METHYL-5-PHENYL-2H-1,4-BENZODIAZEPIN-2-ONE

[72] Inventors: Minoru Shindo, Tokyo; Kanji Moro, Tokyo; Teizo Shinozaki, Chiba-ken, all of Japan

[73] Assignee: Chugai Seiyaku, Kabushiki Kaisha, Tokyo, Japan

[22] Filed: Oct. 27, 1970

[21] Appl. No.: 84,549

Related U.S. Application Data

[62] Division of Ser. No. 841,611, Oct. 27, 1970.

[52] U.S. Cl. .......................260/239.3 D, 260/562 N
[51] Int. Cl. ................................................C07d 53/06
[58] Field of Search................................260/239.3 D

[56] References Cited

UNITED STATES PATENTS 3,371,085   2/1968   Reeder et al........260/239.3 D

*Primary Examiner*—Henry R. Jiles
*Assistant Examiner*—Robert T. Bond
*Attorney*—Otto John Munz

[57] ABSTRACT

The known 7-chloro-1,3-dihydro-1-methyl-5-phenyl-2H-1, 4-benzodiazepin-2-one which was found to be pharmacologically effective in neuro-psychic disorders is prepared easily and in high yield by an improved process comprising the reaction of a novel intermediate, N-aminoacetyl-5-chloro-N-methylanthranilic acid, with phosphorus pentachloride followed by reacting with benzene in the presence of aluminum chloride, the intermediate which is also found to have valuable pharmacological activities being, in turn, prepared by the reaction of 5-chloro-N-methyl-N-phthalimidoacetylanthranilic acid with hydrazine.

15 Claims, No Drawings

PROCESS FOR PREPARING 7-CHLORO-1,3-DIHYDRO-1-METHYL-5-PHENYL-2H-1,4-BENZODIAZEPIN-2-ONE

CROSS REFERENCE TO RELATED APPLICATION

This application is a division of application Ser. No. 841 611 filed 14 July 1969.

This invention relates to organic compounds and the process for the production thereof. More particularly, this invention relates to an improved process for preparing 7-chloro-1,3-dihydro-1-methyl-5-phenyl-2H-1,4-benzodiazepin-2-one, which is remarkably effective in neuro-psychic disorders, to a novel N-aminoacetyl-5-chloro-N-methylanthranilic acid which is a valuable intermediate for the production of the above-described benzodiazepine and to a process for the production of the intermediate.

Heretofore, it was known that 7-chloro-1,3-dihydro-1-methyl-5-phenyl-2H-1,4-benzodiazepin-2-one can be prepared by, for example, a method which comprises (a) reacting 2-methylamino-5-chlorobenzophenone with glycine ethyl ester hydrochloride in pyridine (Japanese Pat. publication No. 30299/64), or (b) reacting 2-methylamino-5-chlorobenzophenone with chloroacetyl chloride in ether and stirring the resulting 2-(N-methyl)-chloroacetamide-5-chlorobenzophenone in methanolic ammonia (Japanese Pat. publication No. 30300/64).

However, the above well-known methods are not satisfactory since the yield of the desired product is low and, in addition, the method is not convenient since an easy and a simple process for producing the necessary reactant, i.e., 2-methylamino-5-chlorobenzophenone has not yet been established. Accordingly, neither of the above well-known methods is suitable for filling the increasing demand for said 7-chloro-1,3-dihydro-1-methyl-5-phenyl-2H-1,4-benzodiazepin-2-one.

In view of the above disadvantages of the well-known methods, the present inventors searched for a process by which the desired 7-chloro-1,3-dihydroxy-1-methyl-5-phenyl-2H-1,4-benzodiazepin-2-one could be produced in large amount and at low cost from an easily available starting material, and they found that the novel intermediate, N-aminoacetyl-5-chloro-N-methylanthranilic acid can easily be obtained by reacting 5-chloro-N-methyl-N-phthalimidoacetylanthranilic acid with hydrazine, and that the desired 7-chloro-1,3-dihydro-1-methyl-5-phenyl-2H-1,4-benzodiazepin-2-one can be obtained in high yield and high purity by reacting said intermediate with phosphorus pentachloride under normal pressure at normal or relatively low temperature followed by reacting with benzene in the presence of aluminum chloride under the same conditions.

The primary object of this invention is therefore to provide novel N-aminoacetyl-5-chloro-N-methylanthranilic acid which is useful as an intermediate for conveniently producing the desired 7-chloro-1,3-dihydro-1-methyl-5-phenyl-2H-1,4-benzodiazepin-2-one, and the process for the production of said intermediate.

Another object of this invention is to provide an improved process for the production of 7-chloro-1,3-dihydro-1-methyl-5-phenyl-2H-1,4-benzodiazepin-2-one.

The intermediate, N-aminoacetyl-5-chloro-N-methylanthranilic acid is a novel compound not previously described in the literature, and is soluble in water and, in addition to its usefulness as an intermediate for the production of 7-chloro-1,3-dihydro-1-methyl-5-phenyl-2H-1,4-benzodiazepin-2-one, is useful per se as a medicine because of its antipyretic, analogesic, anti-inflammatory, antivirus and other activities.

The first object of this invention, that is the production of the novel intermediate, N-aminoacetyl-5-chloro-N-methylanthranilic acid, can be accomplished by reacting 5-chloro-N-methyl-N-phthalimidoacetyl-anthranilic acid with hydrazine in an appropriate solvent. The solvent which can be used in this reaction includes, for example, methanol, ethanol, chloroform and the like, the particularly preferred solvent being ethanol. The reaction proceeds at normal temperature, but is advantageously carried out while heating the reactants on a water bath for a period of from one to several hours.

The second object of this invention, that is, the production of 7-chloro-1,3-dihydro-1-methyl-5-phenyl-2H-1,4-benzodiazepin-2-one from the above prepared intermediate, can be accomplished by reacting the thus obtained N-amino-acetyl-5-chloro-N-methylanthranilic acid with phosphorus pentachloride in an appropriate solvent, for example, methylene chloride, chloroform, carbon tetrachloride, benzene, nitrobenzene, carbon disulfide or the like. The reaction may be conducted at room temperature, but is also operative while ice-cooling or at elevated temperature. The reaction period may appropriately be selected from few minutes to several tens of hours depending upon the temperature used in the reaction. After completion of the reaction, the succeeding reaction may be effected by using the reaction mixture as such when the solvent used will not adversely affect the succeeding reaction, for example, benzene, nitrobenzene or carbon disulfide. Otherwise, the succeeding reaction is conducted after the solvent is distilled off from the reaction mixture. In order to effect the succeeding reaction, an excess amount of benzene is added to the reaction mixture or the residue from the previous reaction followed by the addition of an equimolar to excess amount of aluminum chloride. In the case where a substantial amount of benzene has been used as a solvent for the previous reaction of 5-chloro-N-methyl-N-phthalimidoacetylanthranilic acid with hydrazine, the subsequent addition of benzene discussed above is not necessary since the remaining benzene will serve as a reactant in the succeeding reaction. The reaction may be effected at room temperature to appropriately elevated temperatures for a period selected from few minutes to several tens of hours depending upon the reaction temperature used.

N-aminoacetyl-5-chloro-N-methylanthranilic acid used as an intermediate in the process of this invention possesses a free amino group and is generally not considered as providing satisfactory results through the reactions with phosphorus pentachloride followed by benzene in the presence of aluminum chloride. However, the present inventors unexpectedly found that satisfactory results are brought about by the process of this invention.

Thus, in accordance with the present invention, 7-chloro-1,3-dihydro-1-methyl-5-phenyl-2H-1,4-benzodiazepin-2-one can be prepared in high yield and high purity by simple procedures from an easily available starting material and is therefore provided in large amount and at low cost.

5-chloro-N-methyl-N-phthalimidoacetylanthranilic acid used as a starting material in the process of this invention is a novel compound not previously described in the literature and can be prepared by a simple procedure, for example, by reacting 5-chloro-N-methylanthranilic acid with a phthalimidoacetyl halide in an appropriate organic solvent.

The process of this invention is further illustrated by the following examples, but these examples are not to be construed as limiting the scope of this invention.

EXAMPLE 1

30.0 g (0.0805 mole) of 5-chloro-N-methyl-N-phthalimidoacetylanthranilic acid was added to 2l of an ethanolic solution of 12.1 g of hydrazine hydrate. The mixture was stirred and the resulting white suspension was heat-refluxed for several minutes on a water bath to obtain a clear solution. The solution was further heated to precipitate white crystals. The reaction mixture was cooled after two hours heat-refluxing, and the precipitated crystals were filtered, washed with a small amount of ethanol, placed in 400 ml water and thoroughly mixed. The mixture was adjusted to pH 4 with a small amount of dilute hydrochloric acid, and the insoluble substance was filtered off. The filtrate was then adjusted to pH 7 with a dilute aqueous sodium hydroxide and concentrated to dryness under reduced pressure. The residual white crystals were recrystallized from methanol to give 17.5 g of 5-chloro-N-methyl-N-aminoacetylanthranilic acid as white needle crystals. Yield, 89.7 percent; melting point, 195°–198 °C. Repeated recrystallization from methanol yielded crystals having a melting point of 203°–204°C.

Analysis

Calcd. for $C_{10}H_{11}N_2ClO_3$: C,49.50; H,4.57; N,11.54
Found: C,49.43; H,4.59; N,11.47

The 5-chloro-N-methyl-N-phthalimidoacetylanthranilic acid used as starting material was prepared as follows:

Three hundred ml of a chloroform solution containing 57 g of phthalimidoacetyl chloride was added to 1,000 ml of a chloroform solution containing 42 g of 5-chloro-N-methylanthranilic acid, and the mixture was refluxed for 6 hours on a water bath under stirring. After allowing to cool, the insoluble portion was removed by filtration, and the filtrate was concentrated to a volume of approximately one fifth the original volume under reduced pressure to obtain a precipitate which was then filtered to yield 70 g of 5-chloro-N-methyl-N-phthalimidoacetylanthranilic acid as white powdery crystals having a melting point of 212°–215°C. Recrystallization from ethanol yielded crystals having a melting point of 217°–218°C.

EXAMPLE 2

Seventy ml of methylene chloride, 2.2 g of N-aminoacetyl-5-chloro-N-methylanthranilic acid and 8.3 g of phosphorus pentachloride were mixed together and then stirred at room temperature for a while. The solvent was then distilled off under reduced pressure, and 70 ml of benzene was added to the residue. To this was added 20 g of aluminum chloride while cold, and the mixture was then heated slowly and, finally, was stirred for about 20 minutes at reflux. After completion of the reaction, the reaction liquid was poured into a mixture of ice-dilute hydrochloric acid. The separated aqueous layer was neutralized with the addition of an aqueous sodium hydroxide and shaken with methylene chloride to extract the desired product into methylene chloride. The extract was then washed with water, dried and distilled to remove the solvent. Ether was added to the thus obtained oily residue followed by allowing to stand to yield 1.8 g (70 percent yield) of crystals of 7-chloro-1,3-dihydro-1-methyl-5-phenyl-2H-1,4-benzodiazepin-2-one having a melting point of 128°–130°C. The product showed no depression in melting point when admixed with an authentic sample and was also identical in I. R. spectrum with the sample.

What is claimed is:

1. A process for the production of 7-chloro-1, 3-dihydro-1-methyl -5-phenyl-2H-1, 4-benzodiazepin-2-one which comprises reacting N-aminoacetyl-5-chloro-N-methylanthranilic acid with phosphorus pentachloride in the presence of an inert solvent at a temperature between ice-cooling and elevated temperatures, and reacting the resulting reaction product with benzene in the presence of aluminum chloride at a temperature between room temperature and a refluxing temperature of the reaction mixture.

2. A process according to claim 1, wherein the reaction with phosphorus pentachloride is effected in the presence of a solvent selected from the group consisting of methylene, chloride, chloroform, and carbon tetrachloride, the solvent being removed from the resulting reaction mixture upon completion of said reaction.

3. A process for the production of 7-chloro-1, 3-dihydro-1-methyl-5-phenyl-2H-1,4-benzodiazepin-2-one which comprises reacting phthalimidoacetylanthranilic acid with hydrazine in the presence of an inert solvent at a temperature between room temperature and refluxing temperature, reacting the resulting reaction product with phosphorus pentachloride in the presence of an inert solvent at a temperature between ice cooling and elevated temperatures and further reacting the thus obtained reaction product with benzene in the presence of aluminum chloride at a temperature between room temperature and refluxing temperature.

4. A process according to claim 4, wherein the reaction with phosphorus pentachloride is effected in the presence of a solvent selected from the group consisting of benzene, nitrobenzene and carbon disulfide.

5. A process according to claim 1, wherein the reaction with benzene is effected at refluxing temperature.

6. A process according to claim 1, wherein the reaction with phosphorus pentachloride is effected at a room temperature and a relatively low temperature.

7. A process according to claim 1, wherein the reaction with phosphorus pentachloride is effected at room temperature.

8. A process according to claim 3, wherein said reaction with hydrazine is effected in the presence of a solvent selected from the group consisting of ethanol, methanol and chloroform.

9. A process according to claim 3, wherein said reaction with hydrazine is effected at refluxing temperature of the solvent.

10. A process according to claim 1, wherein said reaction with hydrazine is effected in ethanol at refluxing temperature of the ethanol and further comprising the step of removing the ethanol from the resulting reaction mixture upon completion of said reaction.

11. A process according to claim 1, wherein said reaction with phosphorus pentachloride is effected in the presence of a solvent selected from the group consisting of methylene chloride, chloroform and carbon tetrachloride, and further comprising the step of removing the solvent from the resulting reaction mixture upon completion of said reaction.

12. A process according to claim 1, wherein said reaction with phosphorus pentachloride is effected in the presence of a solvent selected from the group consisting of benzene, nitrobenzene and carbon disulfide.

13. A process according to claim 1, wherein said reaction with phosphorus pentachloride is effected at room temperature.

14. A process according to claim 1, wherein said reaction with phosphorus pentachloride is effected at a temperature between room temperature and a relatively low temperature.

15. A process according to claim 1, wherein said reaction is effected at refluxing temperature.

* * * * *

UNITED STATES PATENT OFFICE
CERTIFICATE OF CORRECTION

Patent No. 3,692,776      Dated September 19, 1972

Inventor(s) Shindo Minoru et al.

It is certified that error appears in the above-identified patent and that said Letters Patent are hereby corrected as shown below:

On the cover sheet insert [30] Foreign Application Priority Data
    Nov. 15, 1968    Japan    83238/68
    Apr. 24, 1969    Japan    31250/69

Signed and sealed this 6th day of March 1973.

(SEAL)
Attest:

EDWARD M. FLETCHER, JR.        ROBERT GOTTSCHALK
Attesting Officer                Commissioner of Patents